United States Patent
Farstad

(10) Patent No.: US 7,870,929 B2
(45) Date of Patent: Jan. 18, 2011

(54) ENGINE ASSEMBLY, ACOUSTICAL LINER AND ASSOCIATED METHOD OF FABRICATION

(75) Inventor: Jerry E. Farstad, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/111,596

(22) Filed: Apr. 29, 2008

(65) Prior Publication Data

US 2009/0266642 A1 Oct. 29, 2009

(51) Int. Cl.
- B64D 33/02 (2006.01)
- B64D 33/00 (2006.01)
- E04B 1/82 (2006.01)

(52) U.S. Cl. ............. 181/214; 181/292; 244/538; 415/119

(58) Field of Classification Search ........ 181/292, 181/288, 210, 214, 213; 244/1 N, 53 B; 415/119, 914, 173.1

See application file for complete search history.

(56) References Cited

U.S. PATENT DOCUMENTS

| | | | |
|---|---|---|---|
| 3,910,374 A * | 10/1975 | Holehouse | 181/292 |
| 4,035,535 A | 7/1977 | Taylor | |
| 4,106,587 A * | 8/1978 | Nash et al. | 181/213 |
| 4,199,295 A | 4/1980 | Raffy et al. | |
| 4,231,447 A * | 11/1980 | Chapman | 181/213 |
| 4,296,831 A * | 10/1981 | Bennett | 181/224 |
| 4,336,292 A | 6/1982 | Blair | |
| 4,749,150 A * | 6/1988 | Rose et al. | 244/53 B |
| 4,787,473 A * | 11/1988 | Fuchs et al. | 181/224 |
| 5,041,323 A | 8/1991 | Rose et al. | |
| 5,106,668 A | 4/1992 | Turner et al. | |
| 5,180,619 A | 1/1993 | Landi et al. | |
| 5,445,861 A * | 8/1995 | Newton et al. | 428/116 |
| 5,460,865 A | 10/1995 | Tsotsis | |
| 5,618,363 A * | 4/1997 | Mullender et al. | 156/62.2 |
| 5,721,402 A * | 2/1998 | Parente | 181/214 |
| 5,782,082 A | 7/1998 | Hogeboom et al. | |
| 5,966,525 A | 10/1999 | Manzi, Jr. et al. | |
| 6,102,664 A | 8/2000 | Nguyen | |

(Continued)

OTHER PUBLICATIONS

Hiroshi Kobayashi, Development of Adjustable Absorption Acoustic Liner for Active Fan Noise Control, *Aircraft Propulsion Research Center* pp. 63-65.

*Primary Examiner*—Edgardo San Martin
(74) *Attorney, Agent, or Firm*—Alston & Bird LLP

(57) ABSTRACT

An engine assembly, an acoustical liner and an associated fabrication method are provided to address fan blade flutter and fan noise control simultaneously within the same liner area. Fan blade flutter is therefore controlled without necessarily increasing the weight of the engine, impairing the structural integrity of the engine, or increasing the noise generated by the engine. The acoustical liner may have additional acoustical degrees of freedom which permit these seemingly competing concerns to be addressed in a complementary manner. The acoustical liner may include inner and outer barrels with the inner barrel having a perforated face sheet, a perforated back skin and a core disposed between the perforated face sheet and the back skin. The fluid communication between the core and the space between the inner and outer barrels provides additional acoustical degrees of freedom which may be utilized to reduce fan blade flutter while concurrently limiting fan blade noise.

19 Claims, 4 Drawing Sheets

U.S. PATENT DOCUMENTS

| | | |
|---|---|---|
| 6,117,520 A | 9/2000 | Wielinga et al. |
| 6,195,982 B1 | 3/2001 | Gysling et al. |
| 6,379,110 B1 | 4/2002 | McCormick et al. |
| 6,471,482 B2 | 10/2002 | Montgomery et al. |
| 6,530,221 B1 * | 3/2003 | Sattinger et al. ............... 60/725 |
| 6,615,950 B2 * | 9/2003 | Porte et al. .................. 181/292 |
| 6,871,725 B2 * | 3/2005 | Johnson ...................... 181/292 |
| 7,124,856 B2 | 10/2006 | Kempton et al. |
| 7,311,175 B2 * | 12/2007 | Proscia et al. ................ 181/290 |
| 7,331,421 B2 * | 2/2008 | Olsen et al. .................. 181/214 |
| 7,337,875 B2 * | 3/2008 | Proscia et al. ................ 181/214 |
| 7,401,682 B2 * | 7/2008 | Proscia et al. ................ 181/290 |
| 7,413,053 B2 * | 8/2008 | Wasif et al. .................. 181/293 |
| 2003/0098200 A1 * | 5/2003 | Clark ......................... 181/292 |

* cited by examiner

ENGINE ASSEMBLY, ACOUSTICAL LINER AND ASSOCIATED METHOD OF FABRICATION

FIELD OF THE INVENTION

Embodiments of the present invention are directed generally to gas turbine engine assemblies and, more particularly, to an improved acoustical liner and an associated method of fabrication for providing passive control of both fan blade flutter and fan noise.

BACKGROUND OF THE INVENTION

Engines, such as aircraft engines, can generate significant noise. Such noise may be undesirable in populated areas and in other environments in which noise is desirably controlled. As such, acoustical liners for inlets, fan cases, fan nozzles, and other engine installation structures have been developed to reduce the amount of noise emanating from an engine. The acoustical liners generally are disposed within the nacelle of the aircraft engine.

In a turbofan engine, for example, the portion of the inlet portion of the nacelle forward of the fan includes inner and outer barrels separated by an air-filled space. In order to reduce the noise emanating from the engine, the inner barrel can incorporate an acoustical liner. An acoustical liner generally includes a cellular or honeycomb core positioned between a face sheet which faces the air flowing toward the fan and a back skin which faces the outer barrel. The face sheet may be perforated such that some of the acoustic air flow to or through the fan enters the honeycomb core through the perforations in the face sheet. As a result of the interaction of a portion of the air flowing to or through the fan with the honeycomb core, the noise emanating from the engine is reduced. In order to further reduce the resulting noise, a septum may be disposed within the honeycomb core. By controlling the size and number of the perforations as well as the volume of air within the honeycomb cells and the properties of the septum, the performance of the acoustical liner can be tuned to reduce noise in a particular frequency range. In this regard, the perforations through the face sheet provide acoustical inertia, while the volume of air contained in the honeycomb cells provide acoustical compliance, thereby providing a dynamic system with a limited number of acoustical degrees of freedom.

In addition to the noise generated by an engine, another issue associated with turbofan engines is fan blade flutter which may reduce the useful lifetime of the fan blades and, in some situations, may cause the fan blades to fail. In instances in which the fan blades are anticipated to flutter, the fan blades are generally scheduled to be inspected on a more frequent basis, and the lifetime of the fan blades is typically limited relative to fan blades that are not anticipated to flutter. In an effort to eliminate or reduce fan blade flutter, the fan nozzle geometry, that is, the converging/diverging characteristics of the nozzle, may be changed. However, such changes are constrained by the thrust requirements for the engine, and may disadvantageously add to the weight of the aircraft or undermine the structural integrity of the nacelle. Because fan blade flutter involves interaction between vibratory motion of the fan blades and vibratory motion of the surrounding fluid, it is in part an acoustical phenomenon, and the propensity of fan blades to flutter can be changed by manipulating the acoustical frequency response of the nacelle structures. Since the frequency at which fan blades flutter is different from the frequency of fan noise, efforts intended to modify the acoustical liner to improve fan blade flutter margin may be in conflict with the frequency response of the acoustical liner needed to reduce fan blade noise, thereby potentially leading to an increase in the fan blade noise. Discontinuities in acoustical frequency response between regions of the nacelle structure tuned to different frequencies for noise control and fan blade flutter control, respectively, can cause significant increases in noise. For example, acoustical resonators tuned to the fan blade flutter mode frequencies may be installed forward of the fan in an effort to reduce fan blade flutter. However, these acoustical resonators may conflict with the tuning of the inlet in regard to fan blade noise and result in a disadvantageous increase in the fan noise.

Accordingly, it would be desirable to provide for a mechanism for reducing or eliminating fan blade flutter without meaningfully increasing the weight of the engine, impairing the structural integrity of the engine and/or nacelle structures, or causing an increase in fan blade noise.

BRIEF SUMMARY OF THE INVENTION

An engine assembly, an acoustical liner and an associated method of fabricating an acoustical liner are therefore provided according to embodiments of the present invention in order to address at least some of the issues associated with conventional designs. In this regard, embodiments of the present invention provide an acoustical liner which permits fan blade flutter to be addressed without necessarily increasing the weight of the engine, impairing the structural integrity of the engine and/or nacelle structures, or increasing the noise generated by the engine. In this regard, embodiments of the present invention provide an acoustical liner having additional acoustical degrees of freedom which permit these otherwise sometimes competing concerns to be addressed in a complementary manner. As such, embodiments of the present invention permit simultaneous tuning of the acoustical frequency response of the nacelle structures to both fan noise control and fan blade flutter control frequencies over the same areas, thereby avoiding discontinuities in acoustical impedance.

In one embodiment, an acoustical liner is provided which includes an inner barrel having a perforated face sheet, a back skin comprising a plurality of perforations and a core, such as a cellular or honeycomb core, disposed between the perforated face sheet and the back skin. The acoustical liner of this embodiment also includes an outer barrel surrounding and spaced from the inner barrel to define a space therebetween. As a result of its design, the perforations through the inner barrel back skin place the core, such as the honeycomb cells in the core, in fluid communication with the space between the inner and outer barrels. As such, the fluid communication between the core and the space between the inner and outer barrels provides additional acoustical degrees of freedom which may be utilized to simultaneously tune the liner to frequencies needed to reduce fan blade flutter and to frequencies needed to control fan blade noise.

In another embodiment, an engine assembly is provided. The engine assembly includes a fan, a compressor downstream of the fan, a combustion section downstream of the compressor and a turbine downstream of the combustion section. The engine assembly of this embodiment also includes an acoustical liner forward of and surrounding the fan, including inner and outer barrels of the nacelle inlet and/or the engine fan case. The inner barrel includes a core and a back skin disposed on the core and including a plurality of perforations. The outer barrel surrounds and is spaced from the inner barrel to define an air-filled space therebetween. As before, the perforations through the inner barrel back skin place the core such as the honeycomb cells of the core, in fluid communication with the space between the inner and outer barrels thereby providing for additional acoustical degrees of freedom for the acoustical liner.

In either embodiment, the acoustical liner may also includes at least one extension tube extending from the back skin into the space between the inner and outer barrels. The extension tube is in fluid communication with a perforation through the back skin, thereby increasing the acoustical inertia and reducing one or more natural frequencies of the acoustical liner. Additionally or alternatively, the acoustical liner may include a baffle extending from the back skin into the space between the inner and outer barrels with the baffle positioned such that at least one perforation defined by the back skin is in fluid communication with the baffle. The baffle serves to increase the acoustical stiffness of the acoustical liner, thereby tuning the acoustical liner to have higher natural frequencies. The acoustical liner and, in particular, the inner and outer barrels may be configured to have at least one natural frequency within a frequency range associated with fan blade flutter and at least one natural frequency within a frequency range associated with fan noise and fan blade-pass frequencies. As such, the additional acoustical degrees of freedom permit these natural frequencies to be tuned to concurrently address both fan blade flutter and fan noise.

A core of one embodiment may include a plurality of honeycomb cells. As such, the perforations defined by the face sheet and the back skin may open into respective honeycomb cells. The core may also include a septum.

In accordance with another embodiment, a method of fabricating an acoustical liner is provided in which an inner barrel comprising a perforated face sheet, a back skin and a core disposed between the perforated face sheet and the back skin is provided. The inner barrel is positioned within an outer barrel which surrounds and is spaced from the inner barrel to define a space therebetween. A natural frequency of the acoustical liner is then tuned by perforating the back skin to place the core in fluid communication with the space between the inner and outer barrels.

As a result of the fabrication of the acoustical liner, one or more acoustical natural frequencies may be reduced in one embodiment by extending at least one extension tube from the back skin into the space between the inner and outer barrels with the extension tube remaining in fluid communication with the perforation defined by the back skin. Conversely, one or more natural frequencies may be increased by extending a baffle from the back skin into the space between the inner and outer barrels with the baffle being positioned such that at least one perforation defined by the back skin is in fluid communication with the baffle. In this regard, the tuning of the natural frequency may include tuning at least one natural frequency to be within a frequency range associated with fan blade flutter and tuning at least one natural frequency to be within a frequency range associated with fan noise at fan blade-pass frequencies. As such, the acoustical liner and associated engine assembly of embodiments of the present invention can be fabricated and tuned to concurrently address both fan blade flutter and fan noise, typically without meaningfully increasing the weight or sacrificing structural integrity.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
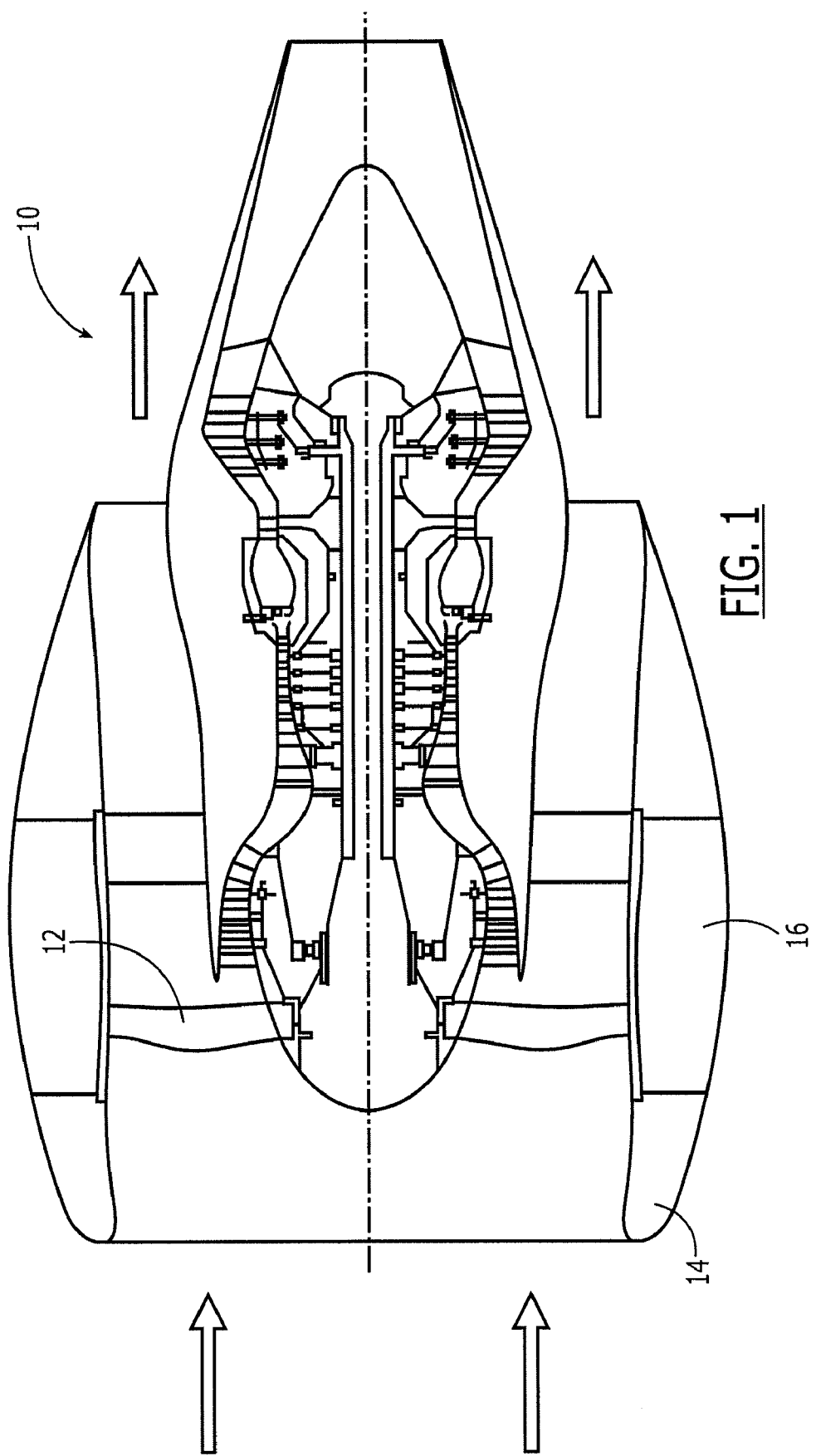
FIG. 1 is a schematic representation of an engine including an acoustical liner in accordance with one embodiment of the present invention.

An engine assembly 10 according to one embodiment to the present invention is depicted in FIG. 1. Although described below in the context of an aircraft engine, the engine assembly can be employed in a variety of different applications, if so desired. As shown, the engine 10 may be a turbofan engine. In the illustrated embodiment, the engine includes two shafts, while other engines may include a single shaft or three or more shafts. As shown in FIG. 1, in instances in which the engine 10 is an aircraft engine, the engine is generally housed in a casing or cowl. The casing or cowl that is then disposed within a nacelle, and the engine and nacelle structures are mounted via a pylon to the wing or fuselage of an aircraft.

In accordance with embodiments of the present invention, the engine assembly 10 also includes an acoustical liner 24 which surrounds the fan 12. In this regard, the acoustical liner may be disposed within the inlet 14 to the engine and/or may be disposed about the fan case 16. However, the acoustical liner can be positioned elsewhere within the engine assembly including downstream of the fan, if desired. As described below, the acoustical liner has multiple acoustical degrees of freedom which permit the acoustical impedance of the liner to be tuned to have at least one natural frequency within a frequency range associated with fan blade flutter and at least one natural frequency within a frequency range associated with fan noise at fan blade-pass frequencies. As such, the acoustical liner can address the otherwise potentially competing issues associated with control fan blade flutter and fan noise without unnecessarily adding to the weight, introducing area discontinuities in acoustical liner frequency response or reducing the structural integrity of the engine or nacelle structures.

Figure 2:
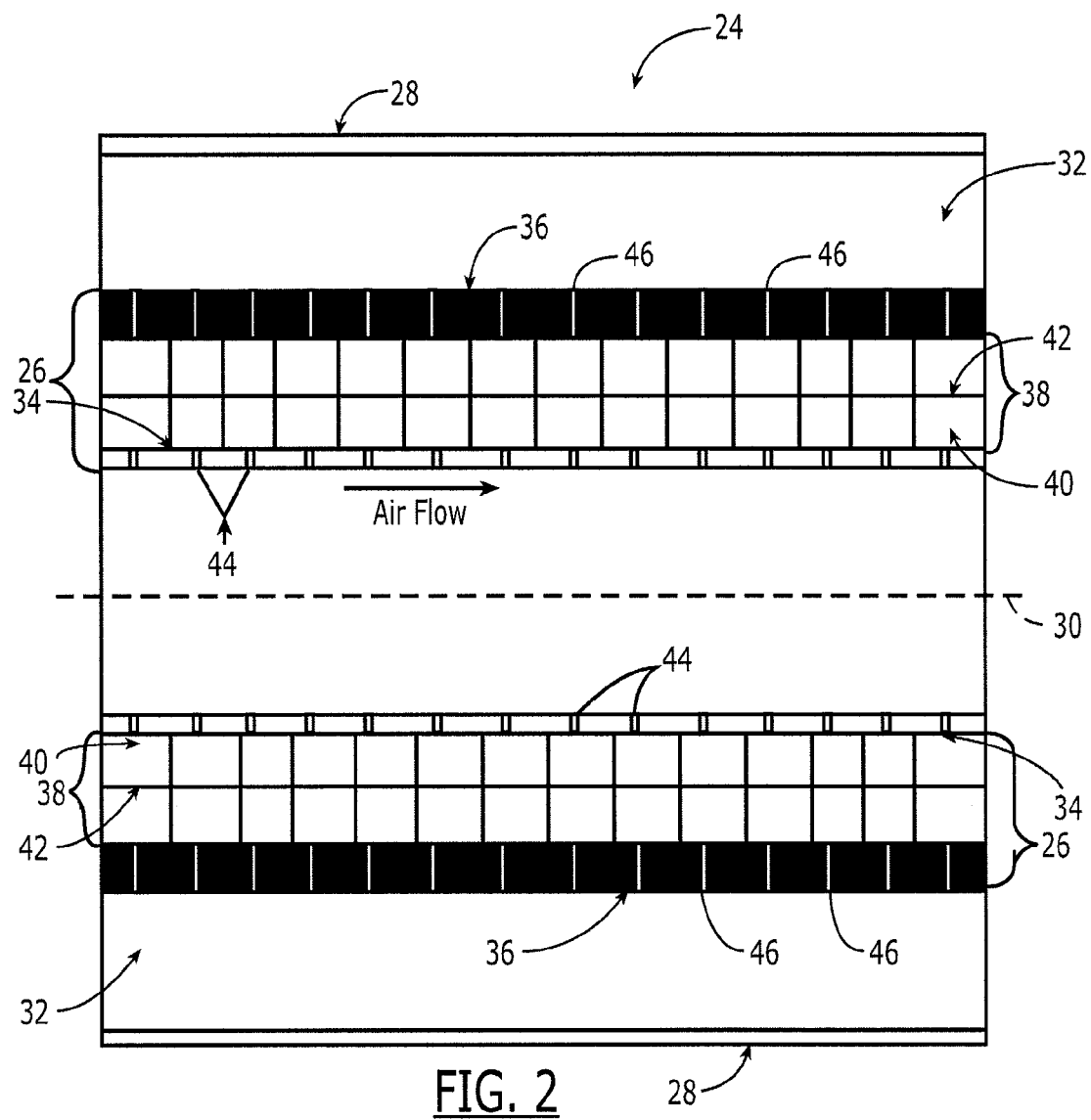
FIG. 2 is a cross-sectional representation of a portion of an acoustical liner in accordance with one embodiment of the present invention.

As shown in more detail in FIG. 2, the nacelle inlet 24 generally includes inner and outer barrels 26, 28. Each barrel generally extends circumferentially about the longitudinal axis 30 of the engine 10 and, more particularly, about the fan 12 in one embodiment. The inner and outer barrels also extend in a lengthwise direction within the inlet or about the fan case. Further, the upstream and downstream ends of the inner and outer barrels are generally sealed or joined, such as by annular end members to thereby define an annular space 32 between the inner and outer barrels.

The inner barrel 26 generally includes a circumferentially extending face sheet 34, a circumferentially extending back skin 36 and a core 38 positioned between the face sheet and the back skin. The face sheet and the back skin of the inner barrel, as well as the outer barrel 28, may be formed of various materials including a metallic material, such as aluminum, or a laminated composite material, such as a carbon or glass reinforced plastic material. The core generally includes a plurality of honeycomb cells 40. Additionally, the core may include a septum 42 extending through the plurality of honeycomb cells. The core, including the honeycomb cells and the septum, may also be formed of various materials including a metallic material, such as aluminum, or a composite material, such as a NOMAX® material available from E. I. du Pont de Nemours and Company.

The face sheet 34 may define a plurality of perforations 44 that open into and are in fluid communication with respective honeycomb cells 40. As such, air flowing to or through the fan 12 may enter the core through the perforations, thereby reducing engine noise. The interaction of the perforated face sheet and the core provide one or more acoustical degree of freedom with acoustical inertia provided by the perforations through the face sheet and acoustical compliance provided by the volume of air contained within the honeycomb cells. The natural frequency of this system may be tuned to give noise reduction in the desired frequency band.

In accordance with embodiments of the present invention, the back skin 36 of the inner barrel 26 may also be perforated. In the illustrated embodiment, the back skin is perforated such that a perforation 46 is defined which opens into each honeycomb cell 40 of the core 38. However, the back skin of other embodiments may define more or fewer perforations. As shown, the perforations defined by the back skin place the honeycomb cells into which the perforations open in fluid communication with the space 32 between the inner and outer barrels 26, 28. The perforations defined by the back skin therefore provide one or more additional acoustical degrees of freedom having acoustical inertia due to the perforation through the back skin of a finite thickness and acoustical compliance due to the additional fluid communication with the air within the space between the inner and outer barrels.

By appropriately sizing and spacing the perforations 46 defined by the back skin 36, a natural frequency of the acoustical liner 24 may be designed to be within a frequency range associated with fan blade flutter, thereby effectively reducing fan blade flutter. In this regard, increasing the size of the perforations generally decreases the natural frequency of the acoustical liner, while decreasing the size of the perforations generally increases the natural frequency of the acoustical liner. Additionally, decreasing the spacing between the perforations generally decreases the natural frequency of the acoustical liner, while increasing the spacing between the perforations generally increases the natural frequency of the acoustical liner. Moreover, by providing a perforated back skin which permits the space 32 between inner and outer barrels 26, 28 to be in fluid communication with the core 38, the acoustical liner of embodiments of the present invention has additional acoustical degrees of freedom relative to a conventional acoustical liner, thereby permitting the acoustical liner to be tuned to have multiple natural frequencies which appropriately align with the different frequency ranges associated with fan blade flutter and with fan noise. In this regard, the size and spacing of the perforations of the face sheet 34 and the back skin of the inner barrel may be configured such that the resulting acoustical liner has at least one natural frequency within a frequency range associated with fan blade flutter, such as 120 to 150 Hertz, and at least one natural frequency within a frequency range associated with fan noise in a fan blade-pass frequency, such as 800 to 1000 Hertz, thereby concurrently addressing issues associated with both fan blade flutter and fan noise.

Figure 3:
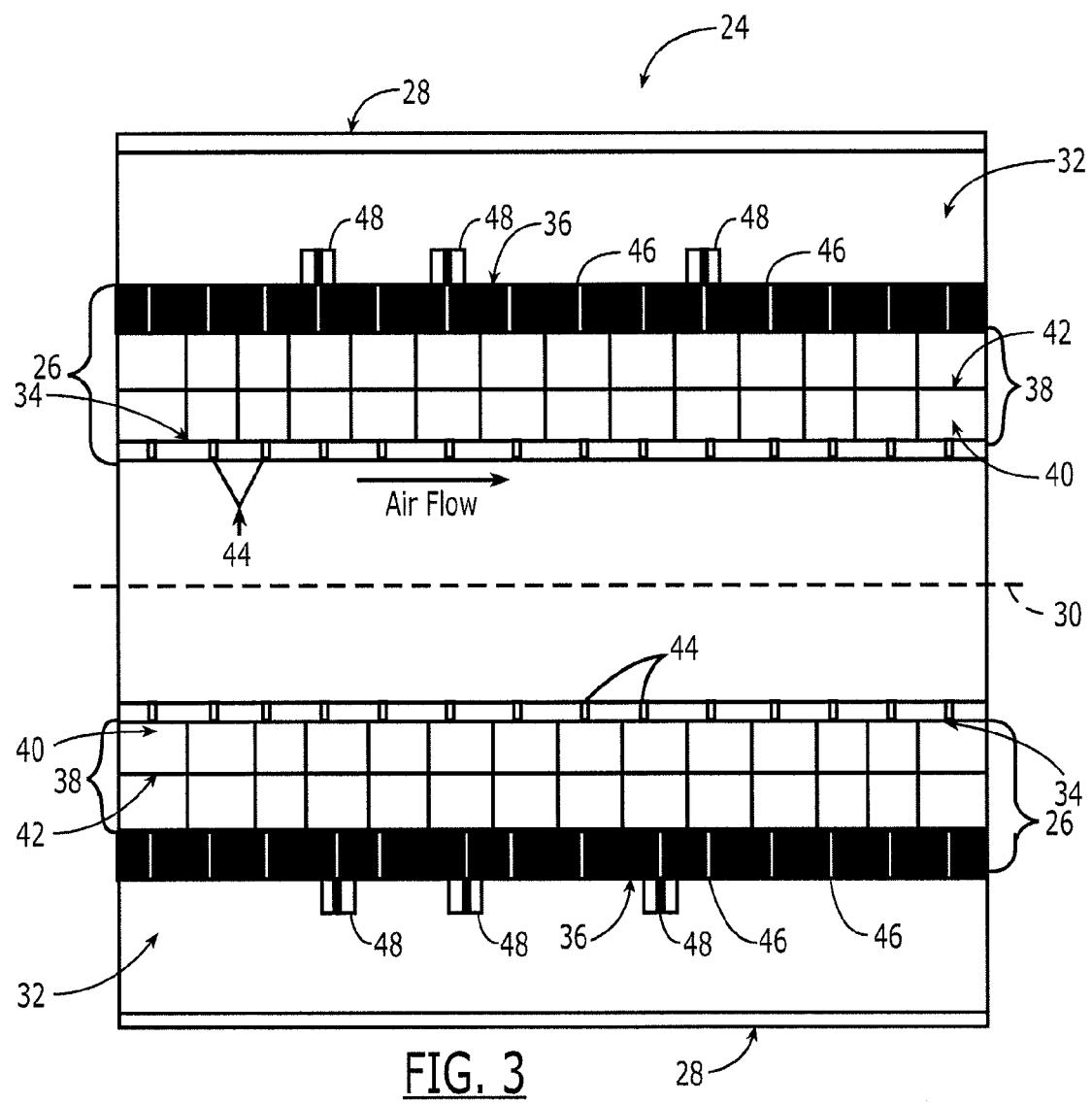
FIG. 3 is a cross-sectional representation of the portion of the acoustical liner depicted in FIG. 2 with the addition of an extension tube.
Figure 4:
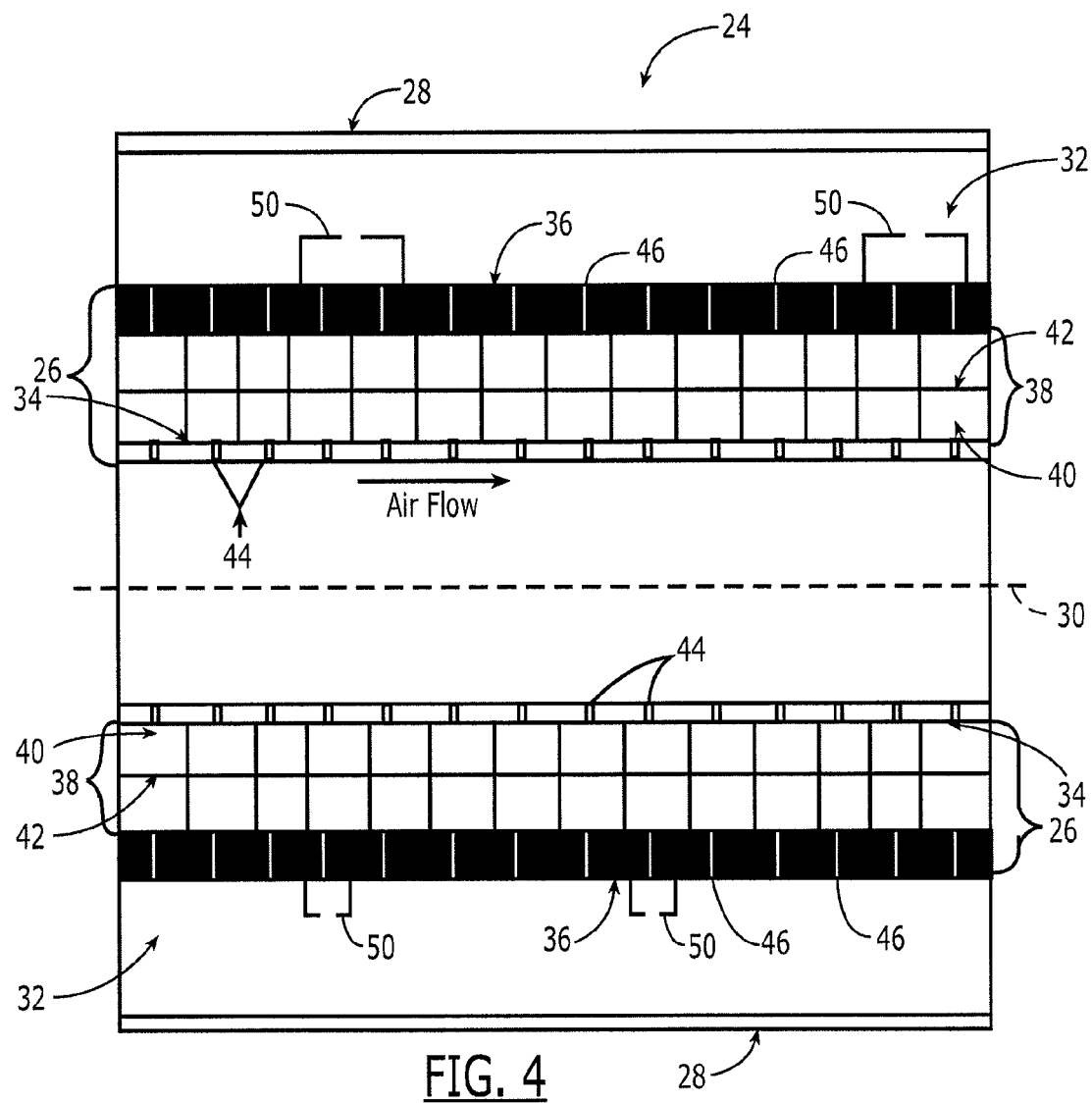
FIG. 4 is a cross-sectional representation of the portion of the acoustical liner depicted in FIG. 2 with the addition of a baffle.

In order to further tune the natural frequencies of the acoustical liner 24, the acoustical liner may include one or more extension tubes 48 and/or baffles 50, as shown in FIGS. 3 and 4, respectively. The extension tubes and baffles can be formed of various materials, such as a metallic material, e.g., aluminum, or a composite or plastic material. With reference to FIG. 3, for example, the acoustical liner may include one or more extension tubes which extend from the back skin 36 of the inner barrel 26 into the space 32 defined between the outer and inner barrels 26, 28. Each extension tube may define a passageway that is associated with and in fluid communication with one or more perforations 46 defined by the back skin. For example, each extension tube of the embodiment of FIG. 3 is in fluid communication with a single respective perforation and, in turn, with a single respective honeycomb cell 40. The extension tubes effectively increase the acoustical inertia without any meaningful increase in the acoustical stiffness of the liner, thereby reducing the natural frequencies of the liner. As such, there is generally an inverse relationship between the changes in the natural frequencies of the liner to the length of the extension tubes with longer extension tubes generally reducing the natural frequencies of the liner more so than shorter extension tubes. The tubes in the embodiment shown in FIG. 3 are straight. In general, the tubes could be formed into any shape to permit tubes of the desired length to be made to fit in the space available between the inner and outer barrels.

As shown in FIG. 4, an acoustical liner 24 of one embodiment may include one or more baffles 50 which extend from the back skin 36 into the space 32 between the inner and outer barrels 26, 28. While the acoustical liner of the illustrated embodiment includes only a few baffles, the acoustical liner could include any plurality of baffles, if so desired. Each baffle at least partially encloses one or more perforations 46. In this regard, each baffle generally includes an opening 52 into the remainder of the space defined between inner and outer barrels, but otherwise defines a relatively closed region 54 that is substantially smaller than the space between inner and outer barrels. The baffles tend to increase the acoustical stiffness of the liner, thereby increasing the natural frequencies of the liner. As such, there is generally an inverse relationship between the change in the natural frequencies of the liner to the volume defined or contained within a baffle with smaller baffles generally increasing the natural frequencies of the liner more so than larger baffles. The baffles can take on any shape desired to provide the desired volume.

While the acoustical liner 24 of the illustrated embodiment includes a baffle 50 which is in fluid communication with two perforations 46 defined by the back skin 36, each baffle may be in fluid communication with any number of perforations, such as a single perforation or three or more perforations. Moreover, in embodiments which include a plurality of baffles, the baffles may be in fluid communication with different numbers of perforations, if so desired. As a result of the various configurations of the baffles, the flexibility with which the natural frequencies of the liner may be tuned may be even further increased.

Although FIGS. 3 and 4 illustrate acoustical liners 24 which include extension tubes 48 and baffles 50, respectively, the acoustical liner of one embodiment may include both extension tubes and baffles if further acoustical degrees of freedom are desired. By appropriate designing the acoustical liner, such as by appropriately sizing and spacing the perforations 46 defined by the back skin 36 and, in some embodiments, by including one or more extension tubes and/or one or more baffles, the natural frequencies of the acoustical liner can be tuned to the desired frequency range. In this regard, the natural frequencies of the acoustical liner can be tuned to have at least one natural frequency within a frequency range associated with fan blade flutter and at least one natural frequency to be within a frequency range associated with fan noise at fan-blade pass frequencies. As such, the acoustical liner of embodiments to the present invention can concurrently reduce fan blade flutter and fan noise with acoustical liner material over a given area. This avoids area discontinuities in the acoustical response of the liner, which are detrimental to both noise control and fan blade flutter control performance. Moreover, the acoustical liner can address both fan blade flutter and fan noise without meaningfully, if at all, adding to the weight of the engine 10 and without reducing the structural integrity of the engine or nacelle structures.

In the embodiments described above, the tuning is primarily accomplished by selection of the size and number of perforations 44, 46 in the inner and outer face sheets 34, 36 of the inlet inner barrel 26, by the thickness of the inner and outer face sheets (usually constrained by strength and weight considerations), and by the volume of the core 38, such as the cells 40 in a honeycomb core. However, the tubes 48 and baffles 50 are secondary devices that permit tuning beyond practical limitations of hole size/spacing, and core size.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An acoustical liner comprising:
   an inner barrel comprising:
      a perforated face sheet;
      a back skin comprising a plurality of perforations; and
      a core disposed between the perforated face sheet and the back skin;
   an outer barrel surrounding and spaced from the inner barrel to define a fluid-filled space therebetween; and
   end members configured to confine fluid contained between the inner and outer barrels to define the space between the inner and outer barrels,
   wherein perforations in the face sheet and a volume of fluid contained in the core provide one or more acoustical degrees of freedom,
   wherein the perforations defined by the back skin place the core in fluid communication with the space between the inner and outer barrels, said perforations in the back skin providing one or more additional acoustical degrees of freedom having acoustical inertia due to a thickness of the back skin in which the perforations are defined and an acoustical compliance due to the fluid communication with the space between the inner and outer barrels, and
   wherein the inner and outer barrels are configured to have at least one natural frequency within a first frequency range associated with fan blade flutter and at least one natural frequency within a second frequency range, different than the first frequency range, associated with fan noise at fan blade-pass frequencies.

2. An acoustical liner according to claim 1 further comprising at least one extension tube extending from the back skin into the space between the inner and outer barrels, wherein the at least one extension tube is in fluid communication with a perforation defined by the back skin, and wherein the at least one extension tube has a length that is selected to reduce the natural frequencies such that at least one natural frequency is within the first frequency range associated with fan blade flutter and at least one natural frequency is within the second frequency range associated with fan noise at fan blade-pass frequencies.

3. An acoustical liner according to claim 1 further comprising a baffle extending from the back skin into the space between the inner and outer barrels, wherein the baffle is positioned such that at least one perforation defined by the back skin is in fluid communication with the baffle, and wherein the baffle defines a volume that is selected to increase the natural frequencies such that at least one natural frequency is within the first frequency range associated with fan blade flutter and at least one natural frequency is within the second frequency range associated with fan noise at fan blade-pass frequencies.

4. An acoustical liner according to claim 1 wherein the inner and outer barrels are configured to have at least one natural frequency within the first frequency range of 120 to 150 Hertz associated with fan blade flutter and at least one natural frequency within the second frequency range of 800 to 1000 Hertz associated with fan noise at fan blade-pass frequencies.

5. An acoustical liner according to claim 1 wherein the core comprises a plurality of cells, wherein the perforations defined by the face sheet and the back skin open into respective cells.

6. An acoustical liner according to claim 5 wherein the core further comprises a septum embedded within the cells.

7. An engine assembly comprising:
   a fan;
   a compressor downstream of the fan;
   a combustor downstream of the compressor;
   a turbine downstream of the combustor; and
   an acoustical liner surrounding the fan, wherein the acoustical liner comprises:
   an inner barrel comprising:
      a perforated face sheet;
      a core; and
      a back skin disposed on the core and comprising a plurality of perforations;
   an outer barrel surrounding and spaced from the inner barrel to define a fluid-filled space therebetween; and
   end members configured to confine fluid contained between the inner and outer barrels to define the space between the inner and outer barrels,
   wherein perforations in the face sheet and a volume of fluid in the core provide one or more acoustical degrees of freedom,
   wherein the perforations defined by the back skin place the core in fluid communication with the space between the inner and outer barrels, said perforations in the back skin providing one or more additional acoustical degrees of freedom having acoustical inertia due to a thickness of the back skin in which the perforations are defined and an acoustical compliance due to the fluid communication with the space between the inner and outer barrels, and wherein the inner and outer barrels are configured to have at least one natural frequency within a first frequency range associated with fan blade flutter and at least one natural frequency within a second frequency range, different than the first frequency range, associated with fan noise at fan blade-pass frequencies.

8. An engine assembly according to claim 7 further comprising at least one extension tube extending from the back skin into the space between the inner and outer barrels, wherein the at least one extension tube is in fluid communication with a perforation defined by the back skin, and wherein the at least one extension tube has a length that is selected to reduce the natural frequencies such that at least one natural frequency is within the first frequency range associated with fan blade flutter and at least one natural frequency is within the second frequency range associated with fan noise at fan blade-pass frequencies.

9. An engine assembly according to claim 7 further comprising a baffle extending from the back skin into the space between the inner and outer barrels, wherein the baffle is positioned such that at least one perforation defined by the back skin is in fluid communication with the baffle, and wherein the baffle defines a volume that is selected to increase the natural frequencies such that at least one natural frequency is within the first frequency range associated with fan blade flutter and at least one natural frequency is within the second frequency range associated with fan noise at fan blade-pass frequencies.

10. An acoustical liner according to claim 7 wherein the inner and outer barrels are configured to have at least one natural frequency within the first frequency range of 120 to 150 Hertz associated with fan blade flutter and at least one natural frequency within the second frequency range of 800 to 1000 Hertz associated with fan noise at fan blade-pass frequencies.

11. An engine assembly according to claim 7 wherein the inner barrel further comprises a perforated face sheet, and wherein the core is positioned between the perforated face sheet and the back skin.

12. An engine assembly according to claim 11 wherein the core comprises a plurality of cells, wherein the perforations defined by the face sheet and the back skin open into respective cells.

13. An engine assembly according to claim 12 wherein the core further comprises a septum embedded within the cells.

14. A method of fabricating an acoustical liner comprising:
providing an inner barrel comprising a perforated face sheet, a back skin and a core disposed between the perforated face sheet and the back skin, wherein perforations in the face sheet and a volume of fluid contained in the core provide one or more acoustical degrees of freedom;
positioning the inner barrel within an outer barrel which surrounds and is spaced from the inner barrel with opposite ends of the inner and outer barrels being sealed by respective end members to define a fluid-filled space therebetween; and
tuning a natural frequency of the acoustical liner via perforation in the back skin to place the core in fluid communication with the space between the inner and outer barrels, wherein said perforations in the back skin provide one or more additional acoustical degrees of freedom having acoustical inertia due to a thickness of the back skin in which the perforations are defined and an acoustical compliance due to the fluid communication with the space between the inner and outer barrels, and wherein tuning the natural frequency comprises tuning at least one natural frequency to be within a first frequency range associated with fan blade flutter and tuning at least one natural frequency to be within a second frequency range, different than the first frequency range, associated with fan noise at fan blade-pass frequencies.

15. A method according to claim 14 further comprising reducing the natural frequency by extending at least one extension tube from the back skin into the space between the inner and outer barrels, wherein the at least one extension tube is in fluid communication with a perforation defined by the back skin, and wherein the at least one extension tube has a length that is selected to reduce the natural frequencies such that at least one natural frequency is within the first frequency range associated with fan blade flutter and at least one natural frequency is within the second frequency range associated with fan noise at fan blade-pass frequencies.

16. A method according to claim 14 further comprising increasing the natural frequency by extending a baffle from the back skin into the space between the inner and outer barrels, wherein the baffle is positioned such that at least one perforation defined by the back skin is in fluid communication with the baffle, and wherein the baffle defines a volume that is selected to increase the natural frequencies such that at least one natural frequency is within the first frequency range associated with fan blade flutter and at least one natural frequency is within the second frequency range associated with fan noise at fan blade-pass frequencies.

17. A method according to claim 14 wherein tuning the natural frequency comprises tuning at least one natural frequency to be within the first frequency range of 120 to 150 Hertz associated with fan blade flutter and tuning at least one natural frequency to be within the second frequency range of 800 to 1000 Hertz associated with fan noise at fan blade-pass frequencies.

18. A method according to claim 14 wherein providing the inner barrel comprises providing the core comprising a plurality of cells, wherein the perforations defined by the face sheet and the back skin open into respective cells.

19. A method according to claim 18 wherein providing the core further comprises positioning a septum within the cells.

* * * * *